United States Patent [19]
Adler et al.

[11] 3,851,970
[45] Dec. 3, 1974

[54] INSTRUMENT FOR MEASURING ULTRA-VIOLET LIGHT

[75] Inventors: Karl Adler, Grenchen; Georges Ducommon, Feldbrunnen, both of Switzerland

[73] Assignee: Biviator S.A., Grenchen, Switzerland

[22] Filed: Jan. 3, 1973

[21] Appl. No.: 320,708

[30] Foreign Application Priority Data
Jan. 14, 1972 Switzerland............ 496/72

[52] U.S. Cl.............. 356/51, 356/218, 250/372
[51] Int. Cl............... G01n 21/34, G01j 1/42
[58] Field of Search............ 356/51, 213, 218, 256; 250/372, 373

[56] References Cited
UNITED STATES PATENTS
3,062,958  11/1962  Warner.................. 250/372
3,366,789  1/1968  Allen..................... 356/51

Primary Examiner—Ronald L. Wibert
Assistant Examiner—Conrad Clark
Attorney, Agent, or Firm—Imirie, Smiley & Linn

[57] ABSTRACT

The present invention relates to an instrument for the measure of the intensity of ultra-violet radiation with an optical and photoelectrical converter, an infrared filter of at least 6 mm and an ultra-violet filter of at least 2 mm thickness, the totality of the filters and converters possessing together a spectral sensitivity only for the wavelength domain of 300 to 315 nm, and an amplifier connecting the converters to an indicator instrument such that output readings are given in $\mu W/cm^2$ linearly in the range of at least 100 $nW/cm^2$ to 1 $mW/cm^2$.

3 Claims, 2 Drawing Figures

INSTRUMENT FOR MEASURING ULTRA-VIOLET LIGHT

The present invention relates to an instrument for measuring the ultra-violet (hereinafter called UV) light in the wavelength range of 300 to 315 nm, hereinafter called the effective range.

This kind of instrument is needed, for example during a UV therapy or during a sun bath, to measure the dosage or allowable exposure time, respectively.

Instruments are known where, in association with particular filters, the effective UV radiation falls on a light-sensitive layer, which upon a photo-chemical reaction and adequate development attains a darkness which is an indicator of the UV-dose. These instruments allow an exact determination of the dose, but are only suited for use in a laboratory environment.

Other instruments are known where the detector consists of UV-sensitive tubes, whose spectral sensitivity are very broadbanded. Therefore these instruments are not suited for the measure of only the effective UV radiation. Furthermore these instruments have all disadvantages of tube-amplifiers with regards to dimensions, mechanical sensitivity, power supply etc.

SUMMARY OF THE INVENTION

It is the aim of the present invention to construct an instrument which is small, insensitive to mechanical vibrations and has low fabrication costs, and which therefore is well suited for both laboratory and daily use, and which enables the selective detection of the effective UV-radiation.

The instrument according to the invention is characterized by obtaining a spectral sensitivity in the effective range with filtering optical transformation of UV-radiation into visible radiation, a photoelectrical converter, and an amplifier which connects the photoelectrical converter with an indicator instrument and whose characteristics permit a reading on said indicator instrument in $\mu W/cm^2$ in a linear range of 100 $nW/cm^2$ to 1 $mW/cm^2$. Conceptually, the present invention includes the selection of at least one infrared filter and one ultra-violet filter so as to detect only the effective range of UV radiation from 300 to 315 nm, and not to limit the angle of view of the measuring cell below 30°, and in addition, the transformation of the non-linear signal curve of the output of the measuring cell, with the aid of an amplifier having a particular transfer function, to provide a linear reading of the radiation intensity in the range of, for example, 100 $nW/cm^2$ to 1 $mW/cm^2$.

DETAILED DESCRIPTION OF THE INVENTION

Figure 1:
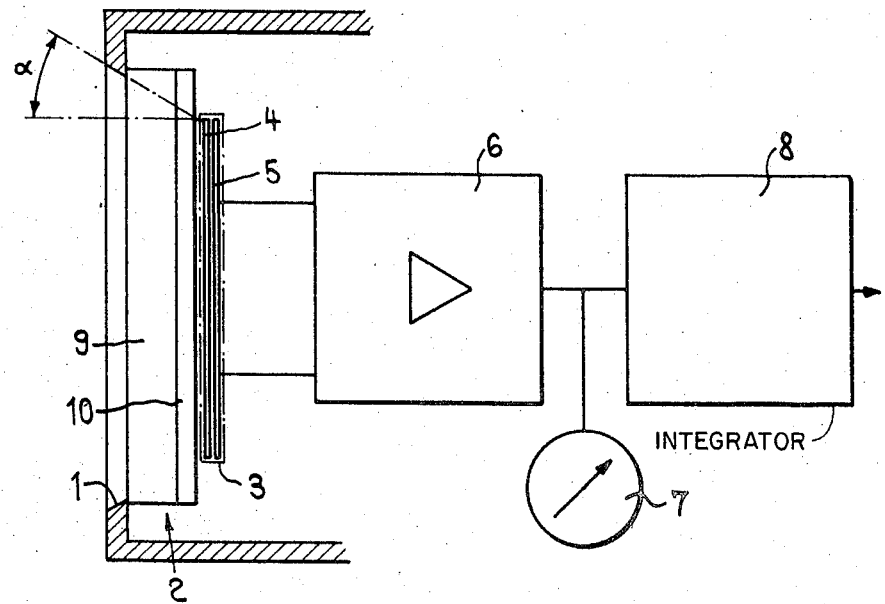
FIG. 1 is a schematic diagram of one example of the instrument of the present invention.

An example of an instrument according to the present invention has behind an opening (1) a filterbox (2) with at least one infrared filter (9) Schott UG 11 with the dimensions: thickness 6 mm, surface 50 × 50 mm, and at least one ultra-violet filter (10) Schott GG 19, thickness 2 mm, surface 50 × 50 mm. Behind said filters is the measuring cell (3) for example Electrocell type SM, which comprises the optical converter (4) which converts ultra-violet radiation in visible radiation, and the photoelectric converter (5) which is sensitive in the visible radiation region.

The output signal of the measuring cell (3) is connected via an amplifier circuit 6 to a direct reading, in $\mu W/cm^2$ calibrated indicator instrument (7).

The signal curve from the cell (3) is divided in, for example, three domains, where each said domain is corrected by adjustment of the impedance with the aid of one precisely aligned resistance of 10 kOhm for each domain, a precisely aligned and stabilized voltage regulator, and by an operational amplifier, for example a Penta 73170921 from Pentatron Ltd., resulting in a reading which is linear over almost the whole measuring range of, for example, 100 $nW/cm^2$ to 1 $mW/cm^2$. The amplifier and / or the indicator instrument must have means for switching between different domains of sensitivity. It is also preferable that the input impedance of amplifier (6) be much higher than the internal resistance of the cell (5) for all measuring ranges.

Figure 2:
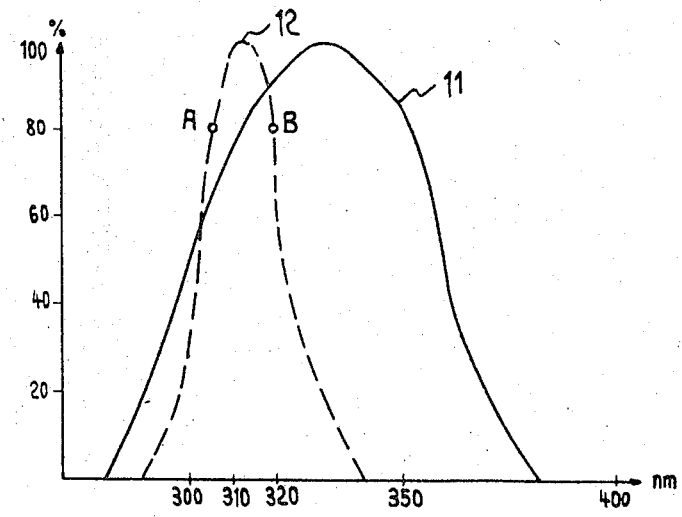
FIG. 2 is a set of sensitivity curves characteristic of the instrument of FIG. 1.

With the schematically shown disposition of FIG. 1 it is thus possible, using the cooperating characteristics of the filters (9), (10), and of the converter (4), (5), to obtain a sensitivity curve (12) FIG. 2. This can be compared with curve (11) which represents the sensitivity curve of the measuring cell Electrocell type SM, without filters. It can be seen from curve 12, that the domain of highest sensitivity of the structure of this invention lies between the points A and B in the wavelength domain of 305 to 318 nm. The domain of effective UV-radiation lies in the range of 300 to 315 nm. Thus the dispostion allows, due in particular to the dimensioning and specific characteristics of the filters, to measure the effective radiation only, and to eliminate in practically ideal manner the UV-radiation outside this effective domain. It is also important to mention, that it is preferable to use the whole measuring surface of the cell (3), which leads to a proper choice of the surfaces of the filters and an angle of view ($\alpha$) FIG. 1, of at least 30°. In connection with the amplifier (6) we have further an electrical device (8), which is able for example to integrate the radiation intensity, and when a determined dose is reached, to shut off a UV-radiator or to trigger an alarm system.

We claim:

1. An instrument for the measure of the intensity of ultra-violet radiation comprising an optical converter for converting ultra-violet radiation into visible radiation, a photoelectric converter disposed adjacent said optical converter for transforming said visible radiation into an electrical signal, at least one infrared filter and at least one ultra-violet filter disposed one behind the other and having surfaces with dimensions such that the measuring cell has an aperture angle of at least 30°, said filters mounted in front of said optical converter and characterized in that said infrared filter has a thickness of at least 6 mm and said ultra-violet filter a thickness of at least 2 mm, said filters and said converters cooperatively exhibiting a spectral sensitivity only in the effective wavelength domain between 300 and 315 nm, and an amplifier, connecting the measuring cell with an indicator instrument, said amplifier having a transfer function coacting with the non-linear electrical signal from said photoelectric converter such that the reading from said indicator instrument is given in $\mu W/cm^2$ linearly in the range of at least 100 $nW/cm^2$ to 1 $mW/cm^2$.

2. An instrument according to claim 1 wherein said amplifier has an input impedance which is much higher than the internal resistance of the photoelectric converter.

3. An instrument according to claim 1 further including an electrical device connected to the output of said amplifier for integrating the radiation intensity output signal therefrom and for triggering the generation of an electrical pulse when a predeterminated radiation dose is reached.

* * * * *